(12) United States Patent
Inoue (10) Patent No.: US 12,446,853 B2
(45) Date of Patent: Oct. 21, 2025

(54) ULTRASONIC ENDOSCOPE

(71) Applicant: FUJIFILM Corporation, Tokyo (JP)

(72) Inventor: Masaya Inoue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 18/060,706

(22) Filed: Dec. 1, 2022

(65) Prior Publication Data

US 2023/0200774 A1 Jun. 29, 2023

(30) Foreign Application Priority Data

Dec. 23, 2021 (JP) ................. 2021-209655

(51) Int. Cl.
 *A61B 8/12* (2006.01)
 *A61B 1/00* (2006.01)
 *A61B 8/00* (2006.01)

(52) U.S. Cl.
 CPC ............ *A61B 8/12* (2013.01); *A61B 1/00082* (2013.01); *A61B 8/4444* (2013.01); *A61B 8/4494* (2013.01)

(58) Field of Classification Search
 CPC ..... A61B 1/00082; A61B 8/12; A61B 8/4245; A61B 8/4444; A61B 8/445; A61B 8/4494; A61B 1/00096; A61B 1/00098; A61B 1/00101; A61B 1/00103; A61B 1/00105; A61B 1/00128; A61B 1/00137; A61B 1/053
 See application file for complete search history.

(56) References Cited

U.S. PATENT DOCUMENTS

| | | | |
|---|---|---|---|
| 5,769,814 A * | 6/1998 | Wijay | A61M 25/104 604/103.1 |
| 5,779,625 A | 7/1998 | Suzuki et al. | |
| 6,189,574 B1 | 2/2001 | Iwasaki et al. | |
| 2004/0162519 A1* | 8/2004 | Helkowski | A61M 1/3659 604/103.09 |
| 2008/0208129 A1* | 8/2008 | Carter | A61M 25/0102 604/164.13 |

(Continued)

FOREIGN PATENT DOCUMENTS

| | | | |
|---|---|---|---|
| JP | 2-265533 A | 10/1990 | |
| JP | 7-184840 A | 7/1995 | |

(Continued)

OTHER PUBLICATIONS

Japanese Office Action for counterpart Japanese Application No. 2021-209655, dated May 8, 2025, with English translation.

*Primary Examiner* — Keith M Raymond
*Assistant Examiner* — Milton Truong
(74) *Attorney, Agent, or Firm* — Birch, Stewart, Kolasch & Birch, LLP (57) ABSTRACT

The ultrasonic endoscope includes: an elongated insertion part having a longitudinal axis and a distal end hard portion provided on a distal end side; an ultrasonic transducer that is provided in the distal end hard portion, and transmits and receives an ultrasonic wave; and a supply port that is provided in the distal end hard portion and supplies water into a balloon surrounding the ultrasonic transducer, in which an indicator indicating a position of the supply port in a peripheral direction around the longitudinal axis is provided on a proximal end side of the insertion part with respect to the distal end hard portion.

12 Claims, 8 Drawing Sheets

(56) References Cited

U.S. PATENT DOCUMENTS

| | | | | |
|---|---|---|---|---|
| 2015/0065807 A1* | 3/2015 | Greenberg | ............... | A61B 1/05 |
| | | | | 600/207 |
| 2019/0133558 A1* | 5/2019 | Morimoto | ................ | A61B 8/12 |
| 2022/0117466 A1* | 4/2022 | Lemyre | .................. | A61L 2/208 |

FOREIGN PATENT DOCUMENTS

| | | | |
|---|---|---|---|
| JP | 2000-325299 A | | 11/2000 |
| JP | 2001112761 A | * | 4/2001 |
| JP | 2003-144381 A | | 5/2003 |
| JP | 2005-131164 A | | 5/2005 |
| JP | 2013-240413 A | | 12/2013 |
| WO | WO 2018/003737 A1 | | 1/2018 |

* cited by examiner

ULTRASONIC ENDOSCOPE

CROSS-REFERENCE TO RELATED APPLICATION

The present application claims priority under 35 U.S.C § 119(a) to Japanese Patent Application No. 2021-209655 filed on Dec. 23, 2021, which is hereby expressly incorporated by reference, in its entirety, into the present application.

BACKGROUND OF THE INVENTION

1. Field of the Invention

The present invention relates to an ultrasonic endoscope, and in particular, relates to an ultrasonic endoscope comprising an ultrasonic transducer provided at a distal end portion of an insertion part.

2. Description of the Related Art

In recent years, an ultrasonic endoscope has been used in a medical field. The ultrasonic endoscope is provided with an ultrasonic transducer that irradiates an inside of a body of a subject with an ultrasonic wave and that receives and images the reflected wave of the ultrasonic wave.

The ultrasonic endoscope disclosed in JP2001-112761A has a distal end formation portion provided at a distal end of an insertion part, and an ultrasonic wave transmission/reception portion (corresponding to an ultrasonic transducer) is provided on a distal end side of the distal end formation portion. In this ultrasonic endoscope, a balloon is mounted on the distal end formation portion so as to cover the ultrasonic wave transmission/reception portion. An ultrasonic wave transmission medium, such as water, is supplied into the balloon to inflate the balloon, and the inflated balloon is brought into close contact with an observation target part, whereby an ultrasonic image necessary for observation is obtained.

In addition, the above-described ultrasonic endoscope has an indicator for indicating a position of an opening portion for discharging the ultrasonic wave transmission medium in the balloon, for the purpose of removing air bubbles in the balloon. This indicator is formed as a marker hole on the distal end side of the distal end formation portion and on a proximal end side with respect to a balloon mounting groove on which a proximal end side of the balloon is mounted. With the ultrasonic endoscope, air bubbles in the balloon are removed by collecting the air bubbles in conformity with the marker hole in a state in which the ultrasonic transducer is directed vertically downward from the distal end formation portion, and then by sucking the ultrasonic wave transmission medium in the balloon through the operation of a suction button. The above-described opening portion also functions as a supply port for supplying the ultrasonic wave transmission medium into the balloon.

SUMMARY OF THE INVENTION

However, in the ultrasonic endoscope of JP2001-112761A, there is a problem that the marker hole is difficult to see because the marker hole may be hidden on a surface on the proximal end side with respect to a surface on which the marker hole is formed, in an outer surface of the distal end formation portion, for example, in a case where an operator tries to view the marker hole from a proximal end side of the insertion part. As a result, there is a problem that it is difficult to grasp a position of the opening portion (supply port).

The present invention has been made in view of such circumstances, and an object of the present invention is to provide an ultrasonic endoscope capable of easily grasping a position of a supply port for supplying an ultrasonic wave transmission medium into a balloon.

In order to achieve the above-described object, according to the present invention, there is provided an ultrasonic endoscope comprising: an elongated insertion part having a longitudinal axis and a distal end hard portion provided on a distal end side; an ultrasonic transducer that is provided in the distal end hard portion, and transmits and receives an ultrasonic wave; and a supply port that is provided in the distal end hard portion, and supplies an ultrasonic wave transmission medium into a balloon surrounding the ultrasonic transducer, in which an indicator indicating a position of the supply port in a peripheral direction around the longitudinal axis is provided on a proximal end side of the insertion part with respect to the distal end hard portion.

According to one aspect of the present invention, it is preferable that the insertion part has a bendable portion connected to a proximal end side of the distal end hard portion and a soft portion connected to a proximal end side of the bendable portion, and the indicator is provided on the soft portion.

According to one aspect of the present invention, it is preferable that the soft portion has a bendable portion adhesive connection portion to which the bendable portion is adhesively connected, and the indicator is provided at a position different from a position of the bendable portion adhesive connection portion.

According to one aspect of the present invention, it is preferable that the indicator is provided in a range on a distal end side with respect to an intermediate position of the soft portion in a direction of the longitudinal axis.

According to one aspect of the present invention, it is preferable that the indicator is provided on the soft portion in a range of 200 mm from a distal end position of the distal end hard portion.

According to one aspect of the present invention, it is preferable that a plurality of scales indicating insertion lengths of the insertion part are formed on the soft portion at positions corresponding to the respective insertion lengths, and the indicator is provided between a position where a scale located on a most distal end side, among the plurality of scales, is formed and a distal end position of the soft portion.

According to one aspect of the present invention, it is preferable that the indicator has a shape different from a shape of the scale.

According to one aspect of the present invention, it is preferable that the indicator has a color different from a color of the scale.

According to one aspect of the present invention, it is preferable that the indicator is provided at a position based on a virtual extension line extending in parallel with the longitudinal axis from the supply port.

According to one aspect of the present invention, it is preferable that the indicator is an indicator mark provided on the virtual extension line.

According to one aspect of the present invention, it is preferable that the indicator is a pair of indicator marks provided at positions facing each other with the virtual extension line interposed therebetween.

According to one aspect of the present invention, it is preferable that the indicator is a printed mark formed by printing using a paint.

According to one aspect of the present invention, it is preferable that the ultrasonic endoscope is a forward viewing endoscope having an observation window provided on a distal end surface of the distal end hard portion, and the ultrasonic transducer is a radial type ultrasonic transducer in which a plurality of ultrasound oscillators are arranged along the peripheral direction around the longitudinal axis.

According to the present invention, it is possible to easily grasp the position of the supply port for supplying the ultrasonic wave transmission medium into the balloon.

DESCRIPTION OF THE PREFERRED EMBODIMENTS

Hereinafter, preferred embodiments of an ultrasonic endoscope according to the present invention will be described with reference to the accompanying drawings.

Figure 1:
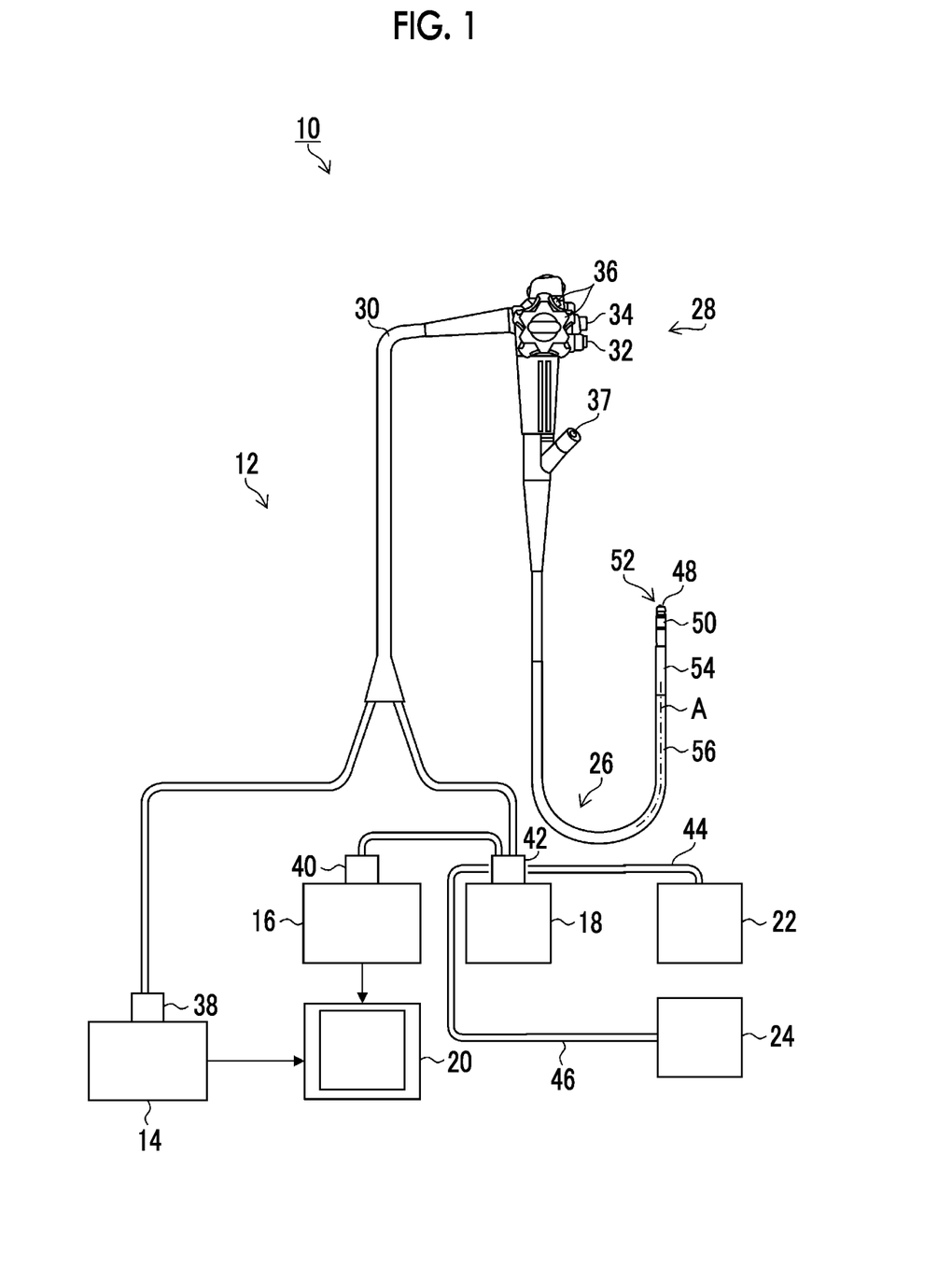
FIG. 1 is a schematic configuration diagram showing an example of an ultrasonic examination system using an ultrasonic endoscope.

FIG. 1 is a schematic configuration diagram showing an example of an ultrasonic examination system 10 using an ultrasonic endoscope 12 of the embodiment.

As shown in FIG. 1, the ultrasonic examination system 10 comprises the ultrasonic endoscope 12, an ultrasonic processor device 14, an endoscope processor device 16, a light source device 18, and a monitor 20. In addition, the ultrasonic examination system 10 comprises a water supply tank 22 that stores wash water and the like, and a suction pump 24 that sucks a sucked substance in the body cavity.

The ultrasonic endoscope 12 has an insertion part 26 inserted into the body cavity of a subject, an operation part 28 that is consecutively installed at a proximal end portion of the insertion part 26 and that is used for an operator to perform an operation, and a universal cord 30 of which one end is connected to the operation part 28. The insertion part 26 is an example of the insertion part of the embodiment of the present invention.

An air/water supply button 32 for opening and closing an air/water supply pipe line (not shown) from the water supply tank 22 and a suction button 34 for opening and closing a suction pipe line (not shown) from the suction pump 24 are installed on the operation part 28 side by side. Further, the operation part 28 is provided with a pair of angle knobs 36 and 36, and a treatment tool insertion port 37.

A connector 38 connected to the ultrasonic processor device 14, a connector 40 connected to the endoscope processor device 16, and a connector 42 connected to the light source device 18 are provided at the other end portion of the universal cord 30. The ultrasonic endoscope 12 is attachably and detachably connected to the ultrasonic processor device 14, the endoscope processor device 16, and the light source device 18 via these connectors 38, 40, and 42, respectively. Further, the connector 42 has an air/water supply tube 44 connected to the water supply tank 22 and a suction tube 46 connected to the suction pump 24.

The insertion part 26 has, in order from the distal end side, a distal end hard portion 52 having an endoscope observation portion 48 and an ultrasonic transducer 50, a bendable portion 54 connected to the proximal end side of the distal end hard portion 52, and a soft portion 56 that interconnects the proximal end side of the bendable portion 54 and the distal end side of the operation part 28. The distal end hard portion 52, the bendable portion 54, and the soft portion 56 are disposed along a longitudinal axis A of the elongated insertion part 26. The bendable portion 54 is formed by connecting a plurality of bending pieces to each other so as to be bendable. The soft portion 56 is thin and elongated, and has flexibility.

Figure 3:
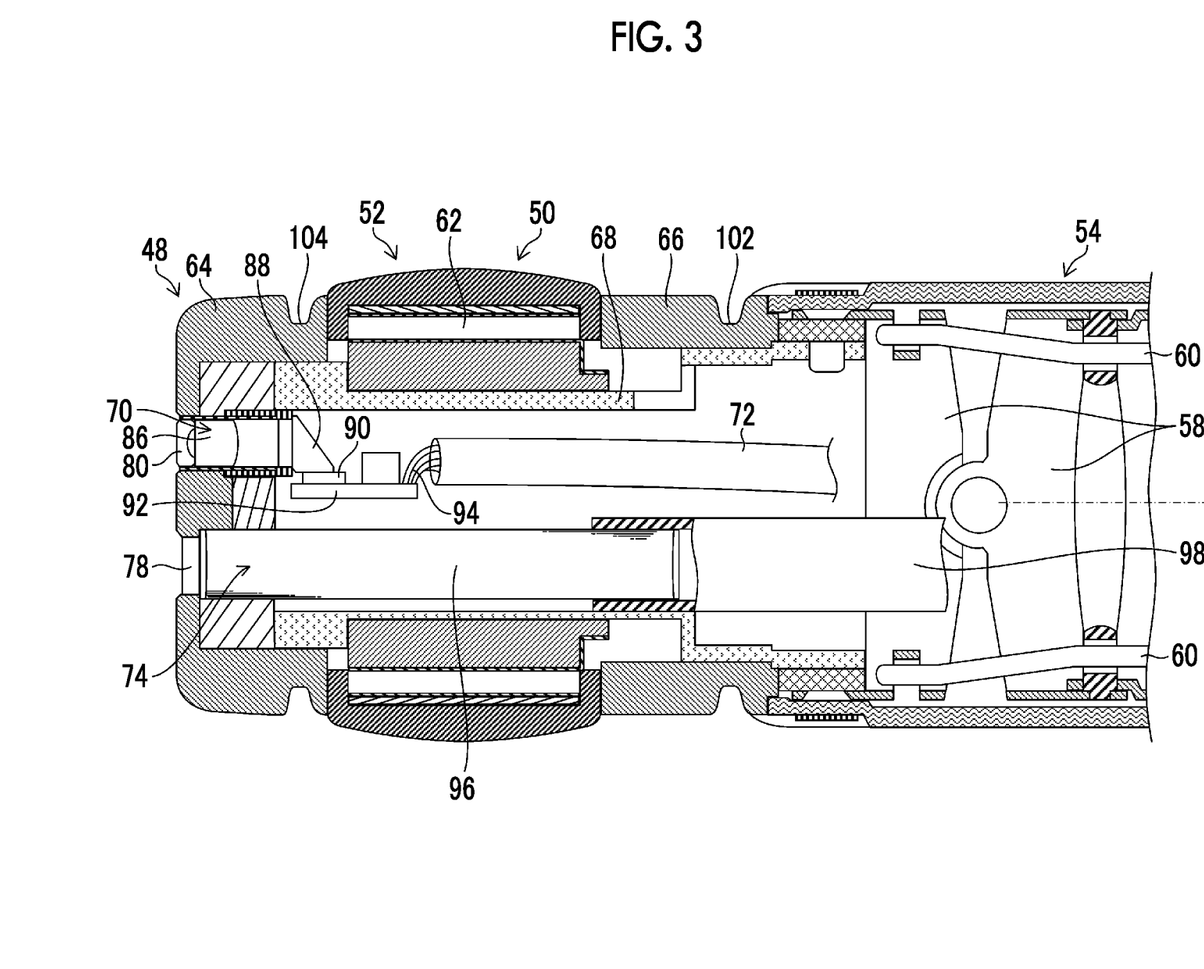
FIG. 3 is a cross-sectional view of the distal end portion of the insertion part shown in FIG. 2.

The bendable portion 54 is operated to be bent remotely by rotationally moving the pair of angle knobs 36 and 36 provided in the operation part 28. With this, the distal end hard portion 52 can be directed in a desired direction. FIG. 3, which will be described later, shows a plurality of bending pieces 58 constituting the bendable portion 54, and a plurality of bending operation wires 60 and 60 (two in FIG. 3). The distal end sides of these bending operation wires 60 and 60 are connected to the bending piece 58, and the proximal end sides thereof are connected to the pair of angle knobs 36 and 36 (see FIG. 1).

Returning to FIG. 1, the ultrasonic processor device 14 generates and supplies an ultrasonic signal for generating an ultrasonic wave to a plurality of ultrasound oscillators 62 (see FIG. 2) constituting the ultrasonic transducer 50. The ultrasonic wave is radiated from the plurality of ultrasound oscillators 62 toward an observation target part. The ultrasonic processor device 14 receives and acquires an echo signal (reflected wave) reflected from the observation target part through the ultrasound oscillators 62, and performs various types of signal processing on the acquired echo signal to generate an ultrasonic image. The generated ultrasonic image is displayed on the monitor 20.

In addition, the observation target part is illuminated with illumination light emitted from the light source device 18, in the endoscope observation portion 48. The endoscope processor device 16 receives and acquires an image signal acquired from the observation target part, and performs various types of signal processing and image processing on the acquired image signal to generate an endoscopic image. The generated endoscopic image is displayed on the monitor 20.

The monitor 20 receives each video signal generated by the ultrasonic processor device 14 and the endoscope processor device 16 and displays the ultrasonic image and the endoscopic image. In the display of the ultrasonic image and the endoscopic image, only one image can be displayed on the monitor 20 by appropriately switching between the ultrasonic image and the endoscopic image, or both the images can also be displayed at the same time.

Figure 2:
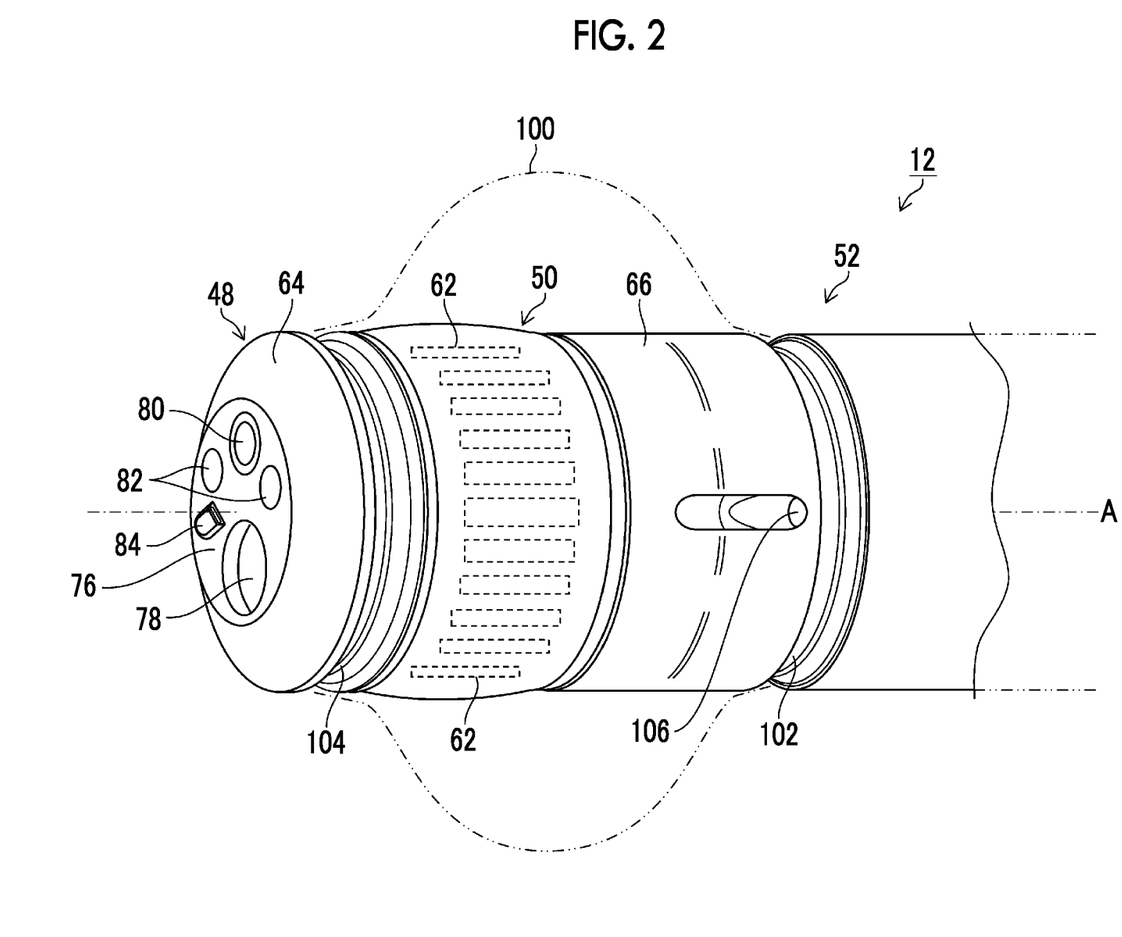
FIG. 2 is an enlarged perspective view of a distal end portion of an insertion part shown in FIG. 1.

Next, a configuration of the distal end portion of the insertion part 26 will be described with reference to FIGS. 2 and 3. FIG. 2 is an enlarged perspective view of the distal end portion of the insertion part 26 shown in FIG. 1. FIG. 3 is a cross-sectional view of the distal end portion of the insertion part 26 shown in FIG. 2.

As shown in FIG. 2, the distal end hard portion 52 is provided with the endoscope observation portion 48 for acquiring the endoscopic image on the distal end side, and is provided with the ultrasonic transducer 50 for acquiring the ultrasonic image on the proximal end side. The ultrasonic transducer 50 is an example of the ultrasonic transducer of the embodiment of the present invention.

As shown in FIGS. 2 and 3, the distal end hard portion 52 has a distal end side cap 64 disposed on the distal end side with respect to the ultrasonic transducer 50 and a proximal end side ring 66 disposed on the proximal end side with respect to the ultrasonic transducer 50. The distal end side cap 64 and the proximal end side ring 66 each consist of an insulating member, such as a hard resin, and serves as an exterior member.

As shown in FIG. 3, a shield ring 68 is connected to the proximal end side of the distal end side cap 64. An observation system unit 70, a shielded cable 72, a forceps pipe line 74, and the like, which will be described later, are disposed inside the shield ring 68, and the ultrasonic transducer 50 is disposed outside the shield ring 68.

As shown in FIG. 2, the ultrasonic transducer 50 is configured by arranging the plurality of ultrasound oscillators 62 that transmit and receive ultrasonic waves in the circumferential direction of the outer peripheral wall of the shield ring 68 (see FIG. 3). That is, the ultrasonic transducer 50 of this example is a radial type ultrasonic transducer in which the plurality of ultrasound oscillators 62 are arranged along a peripheral direction around the longitudinal axis A.

The plurality of ultrasound oscillators 62 are connected to a plurality of cables (not shown), respectively. The plurality of cables are inserted into the operation part 28 from the bendable portion 54 shown in FIG. 1 via the soft portion 56 in a state of being accommodated in, for example, an ultrasound shielded cable. Then, the plurality of cables are inserted from the operation part 28 into the universal cord 30 and are connected to the connector 38 for the ultrasonic wave. The connector 38 is connected to the ultrasonic processor device 14. The ultrasonic signal generated by the ultrasonic processor device 14 is supplied to the plurality of ultrasound oscillators 62 via the plurality of cables.

As shown in FIG. 2, a balloon 100 (see FIG. 4) surrounding the ultrasonic transducer 50 is attachably and detachably mounted on the distal end hard portion 52. An ultrasonic wave transmission medium (for example, water or oil, water will be described in this example) is supplied into the balloon 100. Here, the ultrasonic wave and the echo signal are attenuated in the air. For this reason, the balloon 100 is inflated by supplying water thereinto, the inflated balloon 100 is brought into contact with the observation target part, thereby removing air from between the ultrasonic transducer 50 and the observation target part. With this, the attenuation of the ultrasonic wave and the echo signal can be restrained, so that a good ultrasonic image can be obtained. The balloon 100 will be described later.

As shown in FIG. 2, the endoscope observation portion 48 has a treatment tool outlet port 78, an observation window 80, an illumination window 82, a nozzle 84, and the like, which are open to a distal end surface 76 of the distal end side cap 64. That is, the ultrasonic endoscope 12 of this example is a forward viewing type ultrasonic endoscope having the observation window 80 provided on the distal end surface 76 of the distal end hard portion 52. A pair of illumination windows 82 are provided with the observation window 80 interposed therebetween.

As shown in FIG. 3, the forceps pipe line 74 is connected to the treatment tool outlet port 78. The forceps pipe line 74 has a forceps pipe 96 of which the distal end side is connected to the treatment tool outlet port 78, and a forceps tube 98 of which the distal end side is connected to the proximal end side of the forceps pipe 96. The forceps tube 98 extends from the inner side of the bendable portion 54 to the proximal end side of the soft portion 56 (see FIG. 1), and the proximal end side of the forceps tube 98 is connected to the treatment tool insertion port 37 of the operation part 28 (see FIG. 1). A treatment tool, such as a forceps, is inserted into the forceps tube 98 from the treatment tool insertion port 37 and is led out from the treatment tool outlet port 78 via the forceps pipe 96.

As shown in FIG. 3, the observation system unit 70 is disposed behind the observation window 80 (on the proximal end side). The observation system unit 70 has an objective lens 86, a prism 88, an imaging element 90, a substrate 92, a signal cable 94, and the like.

The reflected light of the observation target part incident from the observation window 80 is captured by the objective lens 86. An optical path of the captured reflected light is bent at a right angle by the prism 88, and an image is formed on an imaging surface of the imaging element 90. The imaging element 90 performs photoelectric conversion of the reflected light of the observation target part imaged on the above-described imaging surface to output an image signal. Examples of the imaging element 90 include a charge-coupled device (CCD) and a complementary metal-oxide semiconductor (CMOS).

The imaging element 90 is mounted on the substrate 92. A circuit pattern (not shown) electrically connected to the imaging element 90 is formed on the substrate 92. The circuit pattern has a plurality of electrodes, and a plurality of the signal cables 94 are connected to these electrodes, respectively. The plurality of signal cables 94 are inserted into the operation part 28 from the bendable portion 54 shown in FIG. 1 via the soft portion 56 in a state of the shielded cable 72 including the plurality of signal cables 94. Then, the plurality of signal cables 94 are inserted from the operation part 28 into the universal cord 30 and are connected to the connector 40 for the endoscope. The connector 40 is connected to the endoscope processor device 16.

An emission end of a light guide (not shown) is connected to each of the illumination windows 82 and 82 shown in FIG. 2. The light guide extends from the insertion part 26 shown in FIG. 1 to the operation part 28 and is inserted from the operation part 28 into the universal cord 30, and an incident end of the light guide is connected to the connector 42 for the light source. The connector 42 is connected to the light source device 18. The illumination light emitted by the light source device 18 propagates through the light guide and is emitted from the illumination windows 82 and 82 of FIG. 2.

The distal end side of the air/water supply pipe line (not shown) is connected to the nozzle 84 shown in FIG. 2. The air/water supply pipe line extends from the insertion part 26 shown in FIG. 1 to the operation part 28 and is inserted into the universal cord 30 from the operation part 28, and the proximal end side of the air/water supply pipe line is connected to the connector 42 for the light source. With this, the proximal end side of the air/water supply pipe line is connected to the water supply tank 22 via the connector 42 and the air/water supply tube 44. The water in the water supply tank 22 is supplied from the air/water supply tube 44 to the air/water supply pipe line via the connector 42 and is ejected from the nozzle 84 toward the observation window 80 and the illumination window 82. In addition, air supplied from an air pump (not shown) is supplied to the air/water supply pipe line, and the air is ejected from the nozzle 84 toward the observation window 80 and the illumination window 82 via the air/water supply pipe line.

Figure 4:
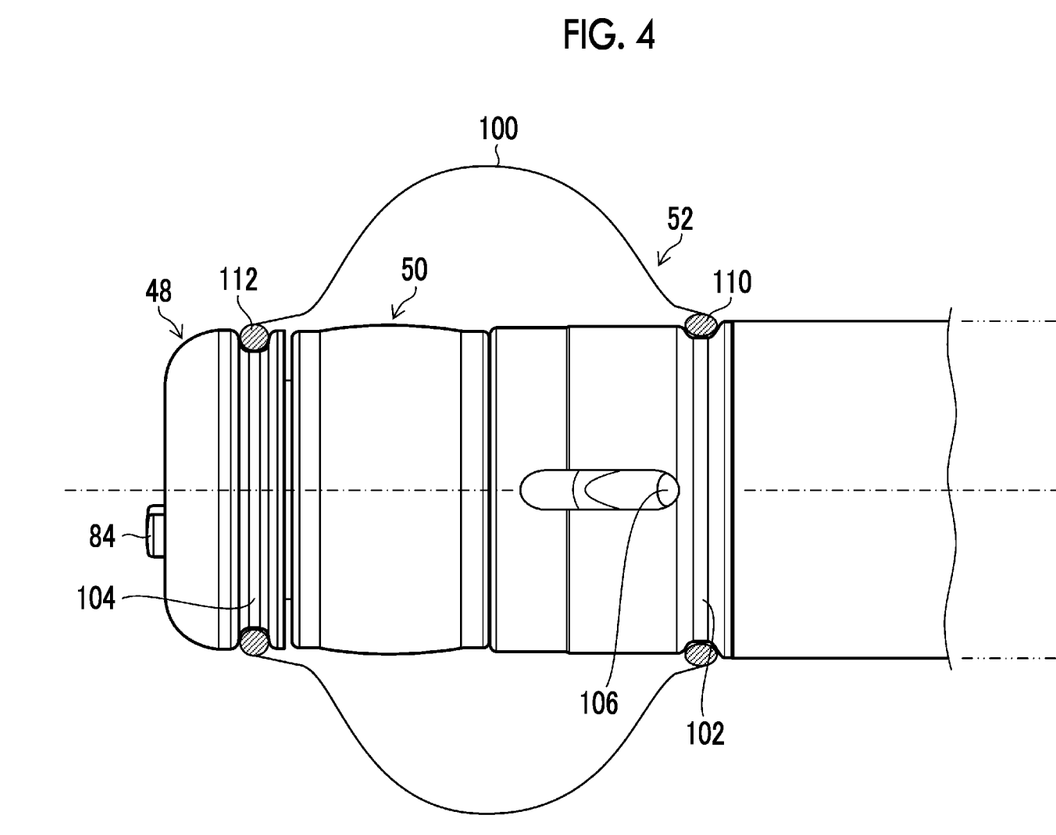
FIG. 4 is a cross-sectional view of a balloon mounted on a distal end hard portion.

Next, the balloon 100 shown in FIG. 4 will be described. FIG. 4 is a cross-sectional view of the balloon 100 mounted on the distal end hard portion 52.

As shown in FIG. 4, a mounting groove 102 for mounting the proximal end side of the balloon 100 and a mounting groove 104 for mounting the distal end side of the balloon 100 are formed on the outer peripheral surface of the distal end hard portion 52. These mounting grooves 102 and 104 are formed on the outer surface of the distal end hard portion 52 along the peripheral direction around the longitudinal axis A.

Further, a supply port 106 for supplying water into the balloon 100 and discharging the water in the balloon 100 is formed between the mounting groove 102 and the mounting groove 104 on the outer surface of the distal end hard portion 52. Further, the supply port 106 is formed between the mounting groove 102 and the ultrasonic transducer 50. Furthermore, the distal end side of a balloon pipe line 108 (see FIG. 6), which will be described later, is connected to the supply port 106. The supply port 106 is an example of the supply port of the embodiment of the present invention.

The balloon 100 is formed of an elastic member, such as rubber. The balloon 100 has a ring-shaped band portion 110 provided on one end side of both ends of the balloon 100 and a ring-shaped band portion 112 provided on the other end side thereof. In the balloon 100, the band portion 110 is elastically mounted on the mounting groove 102, and the band portion 112 is elastically mounted on the mounting groove 104, with respect to the distal end hard portion 52.

Here, in order to make it possible to grasp the position of the supply port 106 from the outside, the ultrasonic endoscope 12 of the embodiment is provided with an indicator indicating the position of the supply port 106 in the peripheral direction around the longitudinal axis A. The ultrasonic endoscope 12 of the embodiment uses the above-described indicator to remove air bubbles in the balloon 100. Hereinafter, an example of the indicator will be described.

Figure 5:
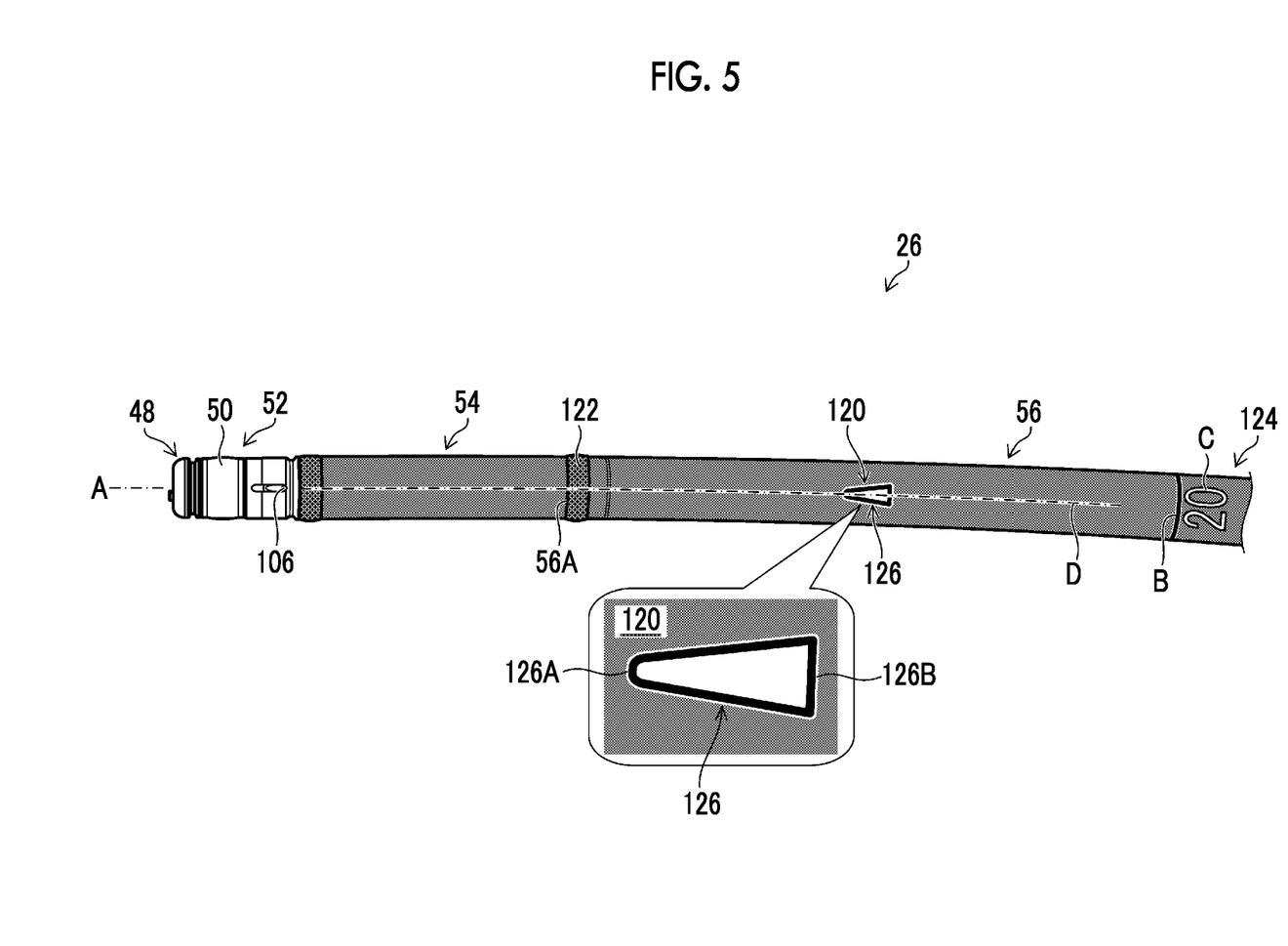
FIG. 5 is a diagram illustrating an example of an indicator provided in the insertion part.

FIG. 5 is a diagram illustrating an example of an indicator 120. The indicator 120 is provided in the insertion part 26. The indicator 120 is an example of the indicator of the embodiment of the present invention.

As shown in FIG. 5, the indicator 120 of this example indicates the position of the supply port 106 in the peripheral direction around the longitudinal axis A as described above, and is provided on the proximal end side of the insertion part 26 with respect to the distal end hard portion 52. The indicator 120 is provided at this position, whereby the operator can view the indicator 120 without the indicator 120 being hidden by the balloon 100 (see FIG. 4) in a case where the operator tries to view the indicator 120 from the proximal end side of the insertion part 26.

The specific disposition position of the indicator 120 will be described. As shown in FIG. 5, the indicator 120 is provided on the soft portion 56. The soft portion 56 has a bendable portion adhesive connection portion 122 to which the bendable portion 54 is adhesively connected. The bendable portion adhesive connection portion 122 is provided on the distal end side of the soft portion 56 along the peripheral direction around the longitudinal axis A. The indicator 120 is provided at a position of the soft portion 56 different from that of the bendable portion adhesive connection portion 122, that is, at a position on the proximal end side with respect to the bendable portion adhesive connection portion 122.

The position of the indicator 120 is not limited to the above-described different position, and may be provided on the bendable portion adhesive connection portion 122. However, since the bendable portion adhesive connection portion 122 is generally formed of a cured adhesive, the outer surface thereof is not a smooth surface. For this reason, it is difficult to provide the indicator 120 on the bendable portion adhesive connection portion 122, and even more so, for example, in a case where the indicator 120 is provided by printing. From such a viewpoint, it is preferable that the indicator 120 is provided on the outer surface of the soft portion 56 at a position different from that of the bendable portion adhesive connection portion 122, that is, at a position where the outer surface is formed as a smooth surface (that is, a position on the proximal end side with respect to the bendable portion adhesive connection portion 122). Alternatively, the indicator 120 may be provided on the bendable portion 54 located on the proximal end side with respect to the distal end hard portion 52. However, the indicator 120 is provided on the soft portion 56, whereby the visibility of the indicator 120 can be enhanced without the indicator 120 being hidden by the bendable portion 54 and the balloon 100 (see FIG. 4) in a case where the operator tries to view the indicator 120 from the proximal end side of the insertion part 26.

Further, the indicator 120 of this example is provided in a range on the distal end side with respect to the intermediate position of the soft portion 56 in the direction of the longitudinal axis A, and specifically, is provided on the soft portion 56 in a range of 200 mm from the distal end position of the distal end hard portion 52.

In addition, a plurality of scales 124 (only one scale 124 is shown in FIG. 5) indicating the insertion lengths of the insertion part 26 are formed on the soft portion 56 at positions corresponding to the insertion lengths. The scale 124 includes a gradation B and a numerical value C, and consists of a printed character or a drawing, which is visible from the outside. Further, the plurality of scales 124 are formed, for example, at a pitch interval of 200 mm from the distal end position of the distal end hard portion 52 of the insertion part 26. In such a soft portion 56, the indicator 120 of this example is provided between a position (a position 200 mm away from the distal end position of the distal end hard portion 52) where the scale 124 located on the most distal end side, among the plurality of scales 124, is formed and a distal end position 56A of the soft portion 56.

Further, it is preferable that the indicator 120 has a shape different from that of the scale 124. The specific shape of the indicator 120 will be described later.

Further, it is preferable that the indicator 120 has a color different from that of the scale 124. The specific color of the indicator 120 will be described. For example, in a case where the color of the soft portion 56 is black or gray close to black and the color of the scale 124 is white, the color of the indicator 120 is yellow as an example in consideration of contrast. The color of the indicator 120 is not limited to yellow, but is preferably a color (for example, yellow-green) that can be contrasted with the colors of the soft portion 56 and the scale 124.

Further, it is preferable that the indicator 120 is provided at a position based on a virtual extension line D extending in parallel with the longitudinal axis A from the supply port 106. As an example thereof, the indicator 120 of this example is provided on the virtual extension line D. In a case where the operator can grasp the position of the supply port 106 from the position of the indicator 120, the position of the indicator 120 may not necessarily be provided on the virtual extension line D. That is, the indicator 120 may be provided at a position deviating from the virtual extension line D in the peripheral direction around the longitudinal axis A (for example, a position deviating from the virtual extension line D by 180 degrees in the peripheral direction around the longitudinal axis A). However, the indicator 120 is provided on the virtual extension line D, whereby the operator can easily grasp that the supply port 106 is located on the virtual extension line D of the indicator 120.

Further, it is preferable that the indicator 120 is an indicator mark 126 provided on the virtual extension line D. The specific indicator mark 126 (corresponding to the shape of the above-described indicator 120) of the indicator 120 will be described. The indicator mark 126 of this example is formed in a substantially isosceles triangle, and is provided on the soft portion 56 such that an apex angle 126A of the substantially isosceles triangle is located on the virtual extension line D and a base 126B is orthogonal to the virtual extension line D. The operator who views the indicator mark 126 can grasp that the supply port 106 is located in a direction (a direction along the virtual extension line D) that the apex angle 126A faces.

Further, the indicator 120 is preferably a printed mark formed by printing using a paint. Here, examples of the paint include a urethane-based paint, an epoxy-based paint, and a fluorine-based paint. Further, the printed mark can be formed by ink pad printing, silk printing, or the like. The indicator 120 is not limited to the printing using a paint (ink), and can also be formed by laser processing (laser marking).

Next, while describing the pipe line configuration of the ultrasonic endoscope 12 shown in FIG. 6, an example of the work of removing air bubbles using the indicator 120 of this example will be described. The pipe line configuration shown in FIG. 6 is an example and is not limited to this pipe line configuration.

Figure 6:
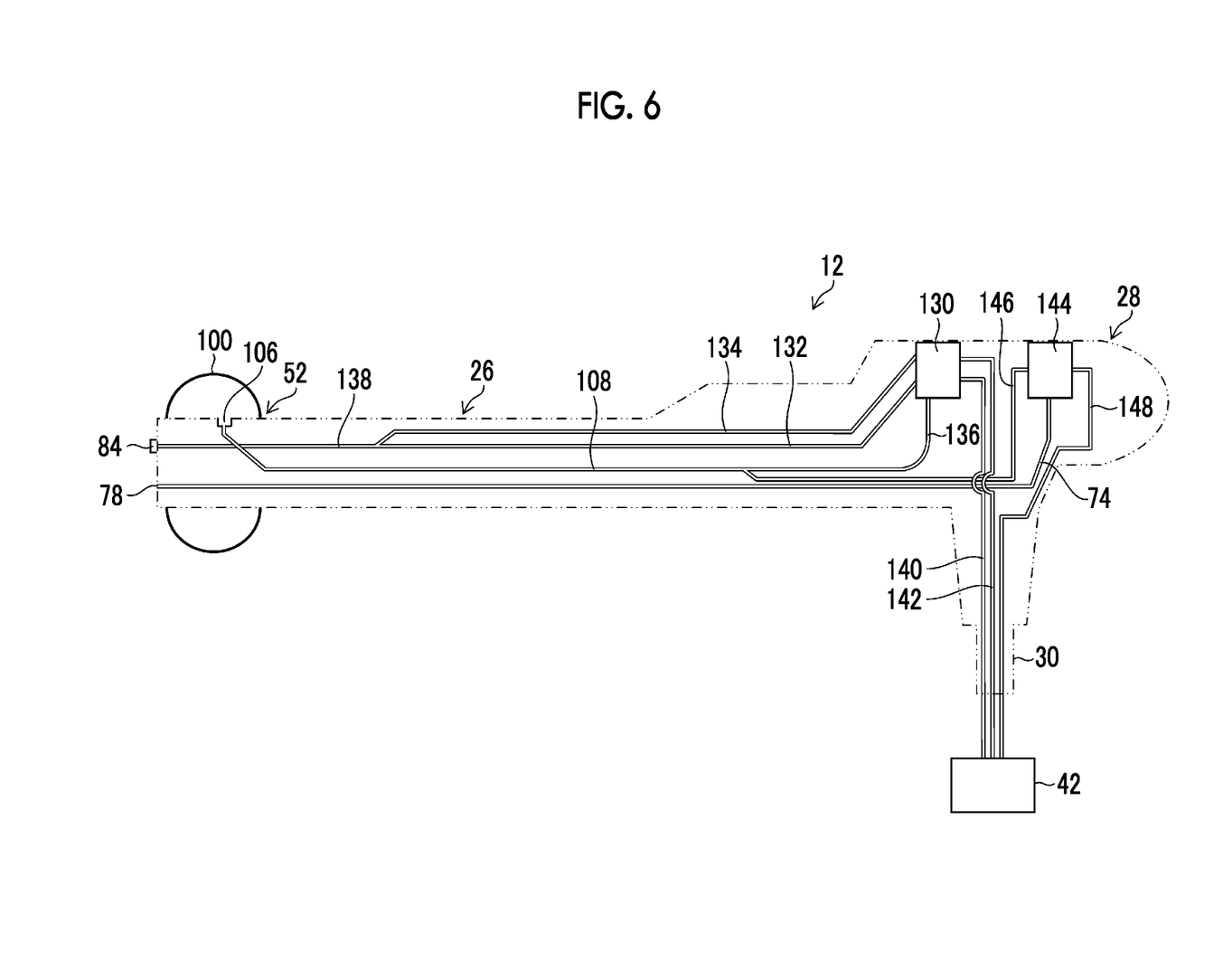
FIG. 6 is a pipe line configuration diagram of the ultrasonic endoscope shown in FIG. 1.

As shown in FIG. 6, the operation part 28 is provided with a cylinder 130 on which the air/water supply button 32 (see FIG. 1) is mounted, and air/water supply is performed via the cylinder 130 by operating the air/water supply button 32. An air supply pipe line 132, a water supply pipe line 134, and a balloon water supply pipe line 136 each extend from the cylinder 130 toward the insertion part 26 side. Among these pipe lines, the air supply pipe line 132 and the water supply pipe line 134 are combined into one air/water supply pipe line 138, and the distal end side of the air/water supply pipe line 138 is connected to the nozzle 84 of the distal end hard portion 52. Further, an air supply pipe line 140 and a water supply pipe line 142 each extend from the cylinder 130 toward the universal cord 30 side, and are each connected to the connector 42.

Further, the operation part 28 is provided with a cylinder 144 on which the suction button 34 (see FIG. 1) is mounted, and suction is performed via the cylinder 144 by operating the suction button 34. The forceps pipe line 74 and a balloon suction pipe line 146 each extend from the cylinder 144 toward the insertion part 26 side. The distal end side of the forceps pipe line 74 is connected to the treatment tool outlet port 78. In addition, the forceps pipe line 74 branches in the middle and is connected to the treatment tool insertion port 37 (see FIG. 1). The balloon suction pipe line 146 is combined into one balloon pipe line 108 together with the balloon water supply pipe line 136, and the distal end side of the balloon pipe line 108 is connected to the supply port 106 (see FIG. 4) of the distal end hard portion 52. Further, a suction pipe line 148 extends from the cylinder 144 toward the universal cord 30 side and is connected to the connector 42.

With the ultrasonic endoscope 12 having the pipe line configuration configured as described above, air supplied from the air pump (not shown) is supplied from the connector 42 to the cylinder 130 via the air supply pipe line 140. Then, the air is supplied to the air supply pipe line 132 by a selective operation of the air/water supply button 32 (see FIG. 1), and then is jetted from the nozzle 84 via the air/water supply pipe line 138. Further, water (ultrasonic wave transmission medium) supplied from the water supply tank 22 (see FIG. 1) is supplied from the connector 42 to the cylinder 130 via the water supply pipe line 142. Then, the water is supplied to the water supply pipe line 134 by a selective operation of the air/water supply button 32 (see FIG. 1), and then is jetted from the nozzle 84 via the air/water supply pipe line 138. Further, the water supplied to the cylinder 130 is supplied from the balloon water supply pipe line 136 to the balloon pipe line 108 by a selective operation of the air/water supply button 32 (see FIG. 1), and is supplied into the balloon 100 from the supply port 106 of the distal end hard portion 52. As a result, the balloon 100 is inflated with water.

On the other hand, the water in the balloon 100 is sucked from the supply port 106 by a selective operation of the suction button 34 (see FIG. 1). This water is sucked from the balloon pipe line 108 into the balloon suction pipe line 146, and then is drained from the cylinder 144 to a suction tank (not shown) via the suction pipe line 148 and the like.

Here, in a case where the balloon 100 is inflated with water, the water supply pipe line 142, the cylinder 130, the balloon water supply pipe line 136, and the balloon pipe line 108 are filled with water, but air bubbles may enter the balloon 100. In this case, since a good ultrasonic observation image cannot be obtained because of the influence of the air bubbles, it is necessary to remove the air bubbles in the balloon 100 in advance in order to obtain a good ultrasonic image. Hereinafter, an example of the work of removing air bubbles will be described.

First, the operator grips the soft portion 56 and determines the orientation of the insertion part 26 such that the distal end hard portion 52 is directed vertically downward from the bendable portion 54. With this, the water in the balloon 100 falls vertically downward because of gravity, and the air bubbles in the balloon 100 rise vertically upward. Then, for example, the orientation of the insertion part 26 is determined such that the distal end hard portion 52 is directed obliquely downward from the bendable portion 54, and then the insertion part 26 is rotated in the peripheral direction around the longitudinal axis A, and the indicator 120 provided on the soft portion 56 is directed upward. At this time, since the indicator 120 is provided on the soft portion 56, the operator can view the indicator 120 without the indicator 120 being hidden by the balloon 100 in a case where the operator tries to view the indicator 120 from the proximal end side of the insertion part 26. In addition, air bubbles are collected on the extension (on the virtual extension line D) toward the distal end hard portion 52 from the indicator 120, by the above-described rotation operation. As a result, air bubbles are collected in the vicinity of the supply port 106.

Next, the water in the balloon 100 is sucked by operating the suction button 34 (see FIG. 1). Then, the air bubbles are sucked together with the water from the supply port 106. Then, the air bubbles are sucked into the balloon pipe line 108 from the supply port 106 before all the water in the balloon 100 is sucked.

After that, in a case where all the water in the balloon 100 is sucked, the air bubbles are discharged from the balloon pipe line 108 to the outside from the suction pump 24 via the balloon suction pipe line 146, the cylinder 144, the suction pipe line 148, and the like. At this time, the balloon pipe line 108, the balloon water supply pipe line 136, the cylinder 130, and the water supply pipe line 142 are filled with water. In this state, water is supplied into the balloon 100 again by operating the air/water supply button 32 (see FIG. 1), and the balloon 100 is inflated with water. With this, the inside of the balloon 100 is filled with water only. As a result, it is possible to perform ultrasound diagnosis without air bubbles, so that a good ultrasonic image can be obtained.

As described above, in the ultrasonic endoscope 12 of the embodiment, a configuration is employed in which the indicator 120 indicating the position of the supply port 106 in the peripheral direction around the longitudinal axis A is provided on the proximal end side of the insertion part 26 with respect to the distal end hard portion 52, so that the operator can view the indicator 120 without the indicator 120 being hidden by the balloon 100 in a case where the operator tries to view the indicator 120 from the proximal end side of the insertion part 26. As a result, the operator can easily grasp the position of the supply port 106.

In particular, in the ultrasonic endoscope 12 of the embodiment, a configuration is employed in which the indicator 120 is provided on the soft portion 56, so that the operator can view the indicator 120 without the indicator 120 being hidden by the balloon 100 and the bendable portion 54. Further, in the ultrasonic endoscope 12 of the embodiment, a configuration is preferably employed in which the indicator 120 is provided at a position (that is, the proximal end side with respect to the bendable portion adhesive connection portion 122) of the soft portion 56 different from that of the bendable portion adhesive connection portion 122. In the soft portion 56, the outer surface of the position on the proximal end side with respect to the bendable portion adhesive connection portion 122 is formed as a smooth surface, so that the indicator 120 can be clearly displayed by providing the indicator 120 at such a position.

In addition, in the ultrasonic endoscope 12 of the embodiment, a configuration is employed in which the indicator 120 is provided in a range on the distal end side with respect to the intermediate position of the soft portion 56 in the direction of the longitudinal axis A, so that the indicator 120 can be brought close to the supply port 106. This makes it easier for the operator to grasp the position of the supply port 106. In particular, in the above-described configuration, it is preferable that the indicator 120 is provided on the soft portion 56 in a range of 200 mm from the distal end position of the distal end hard portion 52, thereby making it easier to grasp the position of the supply port 106.

In addition, in the ultrasonic endoscope 12 of the embodiment, a configuration is employed in which the indicator 120 is provided between the position where a scale 124 located on the most distal end side, among the plurality of scales 124 (only one scale 124 is shown in FIG. 5), is formed and the distal end position 56A (see FIG. 5) of the soft portion 56, so that the indicator 120 can be provided without being mixed with the plurality of scales 124. With this, since the indicator 120 can be easily found, the operator can easily grasp the position of the supply port 106.

In addition, in the ultrasonic endoscope 12 of the embodiment, a configuration is employed in which the indicator 120 has a shape different from that of the scale 124, so that the indicator 120 can be visually distinguished from the scale 124. With this, since the indicator 120 can be easily found, the operator can easily grasp the position of the supply port 106.

In addition, in the ultrasonic endoscope 12 of the embodiment, a configuration is employed in which the indicator 120 has a color different from that of the scale 124, so that the indicator 120 can be visually distinguished from the scale 124. With this, since the indicator 120 can be easily found, the operator can easily grasp the position of the supply port 106.

In addition, in the ultrasonic endoscope 12 of the embodiment, a configuration is employed in which the indicator 120 is provided at a position based on the virtual extension line D extending in parallel with the longitudinal axis A from the supply port 106, so that the operator can grasp the position of the supply port 106 on the basis of the virtual extension line D. In particular, in the above-described configuration, it is preferable that the indicator 120 is provided on the virtual extension line D, thereby making it possible for the operator to easily grasp the position of the supply port 106.

In addition, in the ultrasonic endoscope 12 of the embodiment, since a configuration is employed in which the indicator 120 is the indicator mark 126 provided on the virtual extension line D, the indicator 120 is easily found, whereby the operator can easily grasp the position of the supply port 106.

In addition, in the ultrasonic endoscope 12 of the embodiment, since a configuration is employed in which the indicator 120 is the printed mark formed by printing using a paint, the indicator 120 is easily found, whereby the operator can easily grasp the position of the supply port 106.

Hereinafter, some modification examples related to the indicator will be described.

Figure 7:
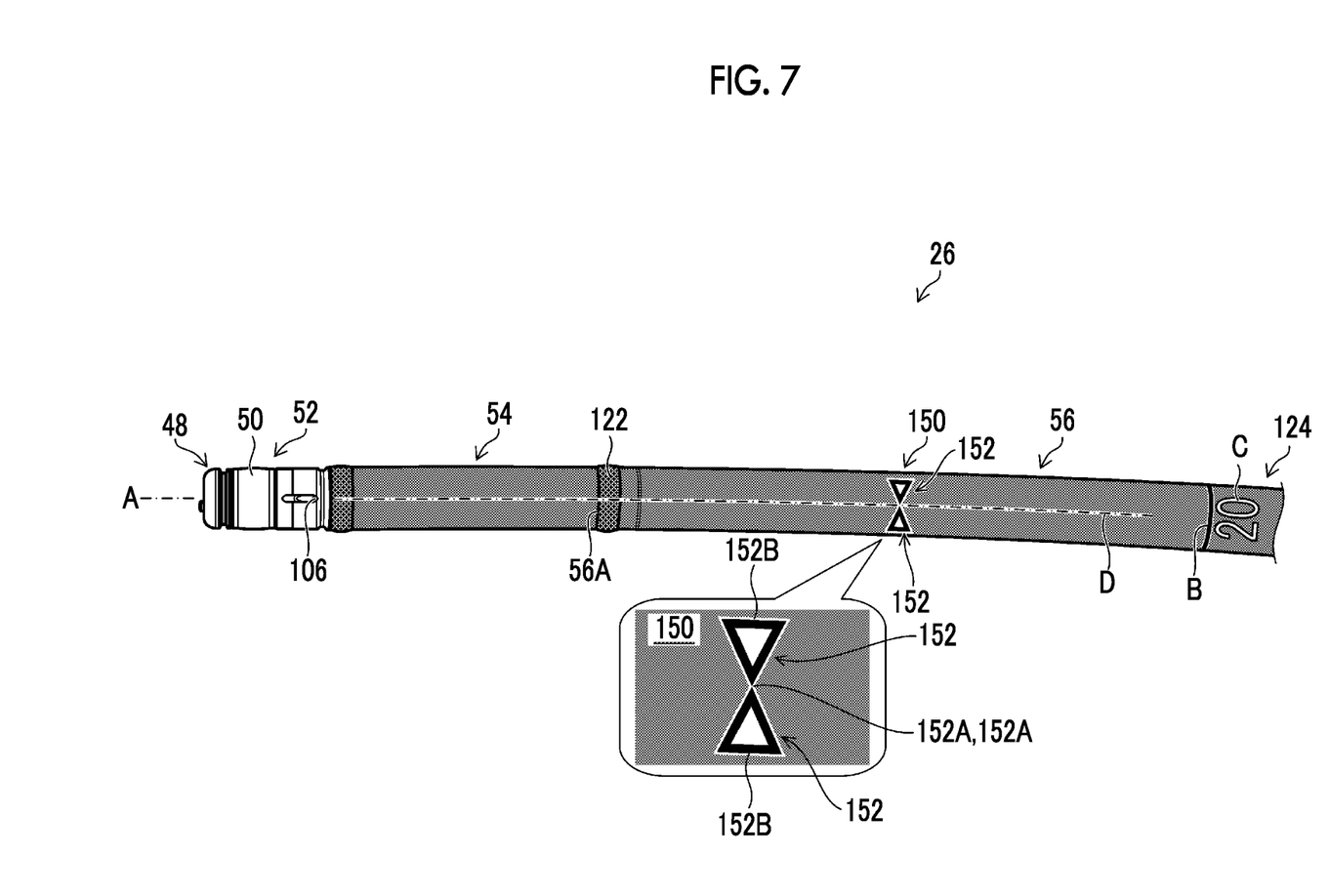
FIG. 7 is a diagram illustrating an indicator of a first modification example.

FIG. 7 shows an indicator 150 of a first modification example. The indicator 150 shown in FIG. 7 is provided on the soft portion 56 as in the indicator 120 shown in FIG. 5, and has a pair of indicator marks 152 and 152 provided at positions facing each other with the virtual extension line D interposed therebetween.

The indicator marks 152 and 152 are each formed in, for example, a substantially isosceles triangle, apex angles 152A and 152A of the substantially isosceles triangles face each other with the virtual extension line D interposed therebetween, and bases 152B and 152B are formed in parallel with the virtual extension line D. The operator who views the indicator marks 152 and 152 can grasp that the supply port 106 is located in a direction toward the distal end hard portion 52 (a direction along the virtual extension line D) with a position where the apex angle 152A and the apex angle 152A face each other as a starting point. As a result, the operator can easily grasp the position of the supply port 106.

Figure 8:
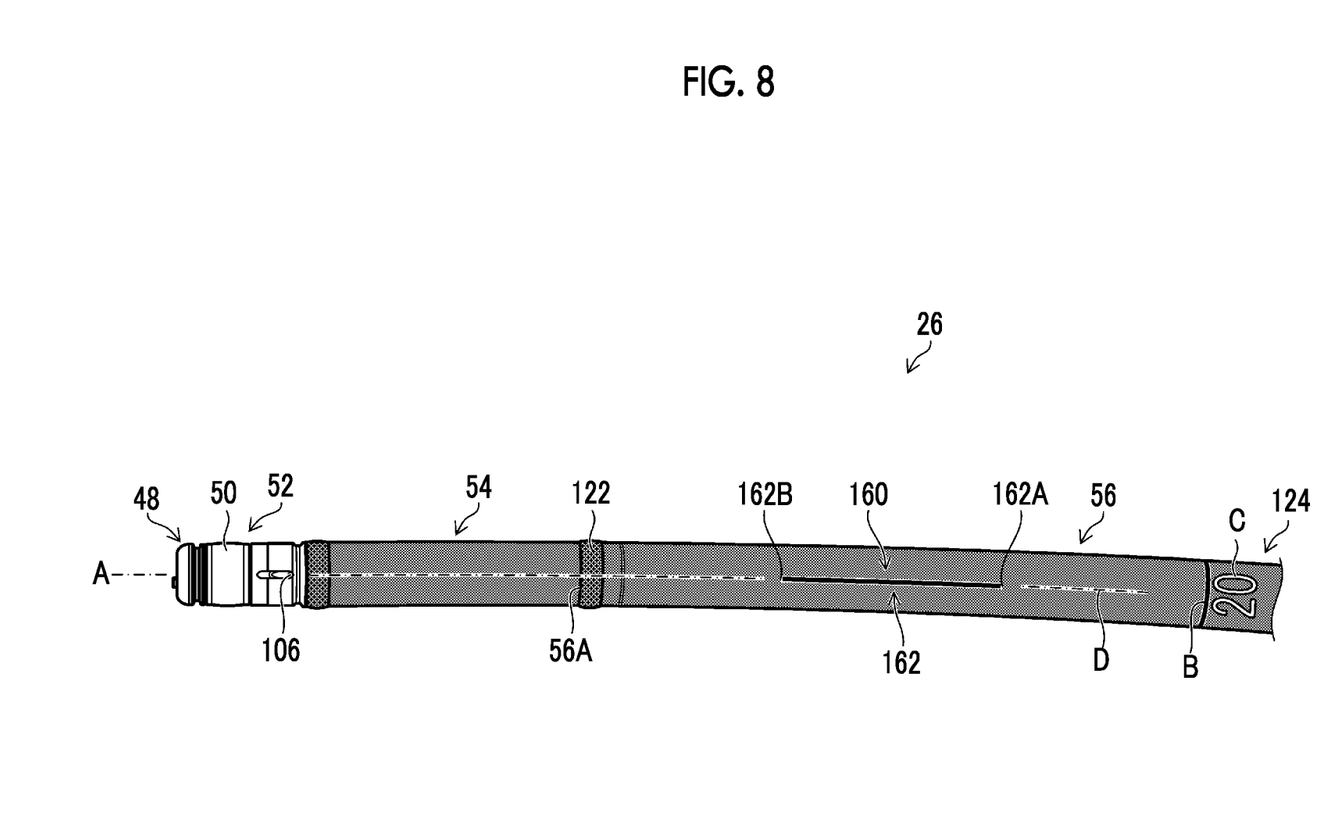
FIG. 8 is a diagram illustrating an indicator of a second modification example.

FIG. 8 shows an indicator 160 of a second modification example. The indicator 160 shown in FIG. 8 is provided on the soft portion 56 as in the indicator 120 shown in FIG. 5, and has an indicator mark 162 along the virtual extension line D.

The indicator mark 162 is a linear mark having a proximal end 162A and a distal end 162B in the soft portion 56. The operator who views the indicator mark 162 can grasp that the supply port 106 is located in a direction along the indicator mark 162 (the direction along the virtual extension line D). As a result, the operator can easily grasp the position of the supply port 106.

Others

In the above-described embodiment, the forward viewing type ultrasonic endoscope 12 having the radial type ultrasonic transducer 50 has been described as an example of the ultrasonic endoscope, but the present invention is not limited thereto. For example, the present invention can be applied to an oblique viewing type ultrasonic endoscope having a radial type ultrasonic transducer and an oblique viewing type ultrasonic endoscope having a convex type ultrasonic transducer.

Although the ultrasonic endoscope according to the embodiment has been described above, some improvements or modifications may be made to the present invention without departing from the gist of the present invention.

EXPLANATION OF REFERENCES

- 10: ultrasonic examination system
- 12: ultrasonic endoscope
- 14: ultrasonic processor device
- 16: endoscope processor device
- 18: light source device
- 20: monitor
- 22: water supply tank
- 24: suction pump
- 26: insertion part
- 28: operation part
- 30: universal cord
- 32: air/water supply button
- 34: suction button
- 36: angle knob
- 37: treatment tool insertion port
- 38: connector
- 40: connector
- 42: connector
- 44: air/water supply tube
- 46: suction tube
- 48: endoscope observation portion
- 50: ultrasonic transducer
- 52: distal end hard portion
- 54: bendable portion
- 56: soft portion
- 58: bending piece
- 60: bending operation wire
- 62: ultrasound oscillator
- 64: distal end side cap
- 66: proximal end side ring
- 68: shield ring
- 70: observation system unit
- 72: shielded cable
- 74: forceps pipe line
- 76: distal end surface
- 78: treatment tool outlet port
- 80: observation window
- 82: illumination window
- 84: nozzle
- 86: objective lens
- 88: prism
- 90: imaging element
- 92: substrate
- 94: signal cable
- 96: forceps pipe
- 98: forceps tube
- 100: balloon
- 102: mounting groove
- 104: mounting groove
- 106: supply port
- 108: balloon pipe line
- 110: band portion
- 112: band portion
- 120: indicator
- 122: bendable portion adhesive connection portion
- 124: scale
- 126: indicator mark
- 126A: apex angle
- 126B: base
- 130: cylinder
- 132: air supply pipe line
- 134: water supply pipe line
- 136: balloon water supply pipe line
- 138: air/water supply pipe line
- 140: air supply pipe line
- 142: water supply pipe line
- 144: cylinder
- 146: balloon suction pipe line
- 150: indicator
- 152: indicator mark
- 152A: apex angle
- 152B: base
- 160: indicator
- 162: indicator mark
- 162A: proximal end
- 162B: distal end
- A: longitudinal axis
- B: gradation
- C: numerical value
- D: virtual extension line

What is claimed is:

1. An ultrasonic endoscope comprising:
an elongated insertion part having a longitudinal axis and a distal end hard portion provided on a distal end side;
an ultrasonic transducer that is provided in the distal end hard portion, and transmits and receives an ultrasonic wave;
a supply port that is provided in the distal end hard portion, and supplies an ultrasonic wave transmission medium into a balloon surrounding the ultrasonic transducer,
wherein the supply port is configured to discharge the ultrasonic wave transmission medium and air bubbles from the balloon,
an indicator indicating a position of the supply port in a peripheral direction around the longitudinal axis is provided on a proximal end side of the insertion part with respect to the distal end hard portion, as information for allowing a user to grasp the position of the supply port in a case where the air bubbles are discharged from the balloon via the supply port,
wherein the insertion part has a bendable portion connected to a proximal end side of the distal end hard portion and a soft portion connected to a proximal end side of the bendable portion, and the indicator is provided on the soft portion.

2. The ultrasonic endoscope according to claim 1,
wherein the soft portion has a bendable portion adhesive connection portion to which the bendable portion is adhesively connected, and
the indicator is provided at a position different from a position of the bendable portion adhesive connection portion.

3. The ultrasonic endoscope according to claim 1,
wherein the indicator is provided in a range on a distal end side with respect to an intermediate position of the soft portion in a direction of the longitudinal axis.

4. The ultrasonic endoscope according to claim 3,
wherein the indicator is provided on the soft portion in a range of 200 mm from a distal end position of the distal end hard portion.

5. The ultrasonic endoscope according to claim 1,
wherein a plurality of scales indicating insertion lengths of the insertion part are formed on the soft portion at positions corresponding to the respective insertion lengths, and
the indicator is provided between a position where a scale located on a most distal end side, among the plurality of scales, is formed and a distal end position of the soft portion.

6. The ultrasonic endoscope according to claim 5,
wherein the indicator has a shape different from a shape of the scale.

7. The ultrasonic endoscope according to claim 5,
wherein the indicator has a color different from a color of the scale.

8. The ultrasonic endoscope according to claim 1,
wherein the indicator is provided at a position based on a virtual extension line extending in parallel with the longitudinal axis from the supply port.

9. The ultrasonic endoscope according to claim 8,
wherein the indicator is an indicator mark provided on the virtual extension line.

10. The ultrasonic endoscope according to claim 8,
wherein the indicator is a pair of indicator marks provided at positions facing each other with the virtual extension line interposed therebetween.

11. The ultrasonic endoscope according to claim 1,
wherein the indicator is a printed mark formed by printing using a paint.

12. The ultrasonic endoscope according to claim 1,
wherein the ultrasonic endoscope is a forward viewing endoscope having an observation window provided on a distal end surface of the distal end hard portion, and
the ultrasonic transducer is a radial type ultrasonic transducer in which a plurality of ultrasound oscillators are arranged along the peripheral direction around the longitudinal axis.

* * * * *